United States Patent [19]

Yokota et al.

[11] Patent Number: 5,313,583
[45] Date of Patent: May 17, 1994

[54] CONTROLLER INTEGRATED CIRCUIT DEVICE FOR CONTROLLING A CONTROL UNIT BY PROVIDING CONTROL DATA THERETO

[75] Inventors: Yoshikazu Yokota; Hiroshi Takeda, both of Kodaira, Japan

[73] Assignee: Hitachi, Ltd., Tokyo, Japan

[21] Appl. No.: 660,877

[22] Filed: Feb. 26, 1991

Related U.S. Application Data

[60] Continuation of Ser. No. 318,254, Mar. 3, 1989, Pat. No. 5,034,913, which is a division of Ser. No. 832,691, Feb. 25, 1986, Pat. No. 4,845,657.

[30] Foreign Application Priority Data

Feb. 25, 1985 [JP] Japan ................... 60-34346

[51] Int. Cl.⁵ ............................. G06F 3/00
[52] U.S. Cl. ..................... 395/275; 395/162; 364/DIG. 1; 364/927.8; 364/926.9; 364/926.93; 364/927.92
[58] Field of Search ............... 395/275, 162, 250, 550; 340/750, 720, 703, 718

[56] References Cited

U.S. PATENT DOCUMENTS

| | | | |
|---|---|---|---|
| 4,494,196 | 1/1985 | Green | 395/275 |
| 4,495,594 | 1/1985 | Eggebrecht et al. | 395/275 |
| 4,580,230 | 4/1986 | Jones et al. | 340/750 |
| 4,583,194 | 4/1986 | Cage | 364/419 |
| 4,586,129 | 4/1986 | Murray, Jr. et al. | 395/775 |
| 4,626,839 | 12/1986 | O'Malley | 340/750 |
| 4,631,692 | 12/1986 | Broedner | 340/701 |
| 4,633,415 | 12/1986 | Vink et al. | 340/726 |
| 4,646,077 | 2/1987 | Culley | 340/748 |
| 4,660,155 | 4/1987 | Thader et al. | 340/799 |
| 4,673,930 | 6/1987 | Bujalski et al. | 340/703 |
| 4,679,027 | 7/1987 | Higuchi | 340/723 |
| 4,745,581 | 5/1988 | Sato et al. | 365/189.05 |
| 4,845,657 | 7/1989 | Yokota et al. | 395/275 |
| 5,034,913 | 7/1991 | Yokota et al. | 395/275 |

FOREIGN PATENT DOCUMENTS

| | | | |
|---|---|---|---|
| 0019029 | 2/1977 | Japan | 340/750 |
| 2169176 | 7/1986 | United Kingdom | 340/750 |

OTHER PUBLICATIONS

Kane, Gerry, "CRT Controller Handbook," 1980, McGraw-Hill, Inc., pp. 5-1 to 5-22.

Primary Examiner—Paul V. Kulik
Attorney, Agent, or Firm—Antonelli, Terry, Stout & Kraus

[57] ABSTRACT

A controller integrated circuit, such as a cathode ray tube controller, constituting a part of a microcomputer system comprises a plurality of internal registers, a designating register to which data designating at least one of the internal registers is set, a selection circuit selecting one of the internal registers by the data of the designating register, a first external terminal to which the data of the register selected by the selection circuit is supplied, and a second external terminal to which a timing signal representing the timing of the data supplied to the first external terminal is supplied. According to this circuit construction, the data inside the controller integrated circuit can be easily referred to be the control of the first register and by use of the first and second external terminals.

12 Claims, 4 Drawing Sheets

CONTROLLER INTEGRATED CIRCUIT DEVICE FOR CONTROLLING A CONTROL UNIT BY PROVIDING CONTROL DATA THERETO

This is a Continuation of application Ser. No. 318,254, filed Mar. 3, 1989, now U.S. Pat. No. 5,034,913 which was a Divisional of application Ser. No. 832,691 filed Feb. 25, 1986, now U.S. Pat. No. 4,845,657.

BACKGROUND OF THE INVENTION

This invention relates generally to semiconductor integrated circuit techniques, and more particularly to a technique which is effectively utilized for LSI (large Scale Integrated Circuits) for controlling peripheral units of a microcomputer, such as a CRT (cathode ray tube) controller.

CRT controllers, DMA (direct memory access) controllers, disc controllers, and the like, are known as controller LSIs for controlling peripheral units constituting a microcomputer system, such as CRT displays, floppy disks, and so forth. In order to detect the content of an internal register or status data in such a controller LSI, it has been necessary in a system using the conventional controller LSI to first examine the status of the LSI by means of a microprocessor or to confirm whether or not the LSI is under the accessible state where it is accessible y the microprocessor, and then to read the register content or the status data in that LSI by means of the microprocessor. Therefore, a waiting state occurs in the system and hence bus efficiency drops.

FIG. 4 of the accompanying drawings is a block diagram of a system using a conventional controller LSI. When it is desired to use the content of an internal register or an internal signal for control outside of a controller LSI 10, a sub-control circuit 13' which latches desired data or signals and generates a control signal for control equipment 15 on the basis of the latched content, as well as a timing generation circuit 14 which decides the latch timing at the sub-control circuit 13' and data output timing for the microprocessor and other devices, have been necessary. In this case, a problem develops in that external circuits of the controller LSI become complicated in construction.

For details of the CRT controller and the DMA controller, refer to the following literatures, respectively:

"Nikkei Electronics" May 21, 1984, No. 343, pp. 222-254 published by Nikkei-McGraw Hill Co.
"Nikkei Electronics" Aug. 2, 1982, No. 296, pp 129-158 published by Nikkei-McGraw Hill Co.

SUMMARY OF THE INVENTION

It is an object of the present invention to provide a controller LSI capable of improving the bus efficiency of a microcomputer system.

It is another object of the present invention to provide a technique which can determine the content of registers and the internal status inside a controller LSI without the need for any complicated external circuits or without relying upon special software for this purpose.

These and other objects and novel features of the present invention will become more apparent from the following description taken in conjunction with the accompanying drawings.

Among the inventions disclosed herein, the following is a summary of a typical example.

In a controller LSI, there in newly provided, a register for designating a register whose content must be referred to and a buffer for taking thereinto and holding therein the content of the register to be referred to or suitable internal signals, and the content of the designated register is taken into the buffer circuit and outputted to outside during such a period which does not affect the control of an external system, that is, during the period in which the controller LSI does not use a bus, by use of the suitable internal signal. At the same time, the suitable internal signal is outputted outside the LSI as a signal representing a load timing. According to this circuit arrangement, the microprocessor can detect the content of a register in the controller LSI without making access thereto, and the internal status that the conventional technique has not been able to know can now be determined. In addition, external circuits which make it possible to know the internal status can also be simplified.

DESCRIPTION OF THE PREFERRED EMBODIMENTS

Figure 1:
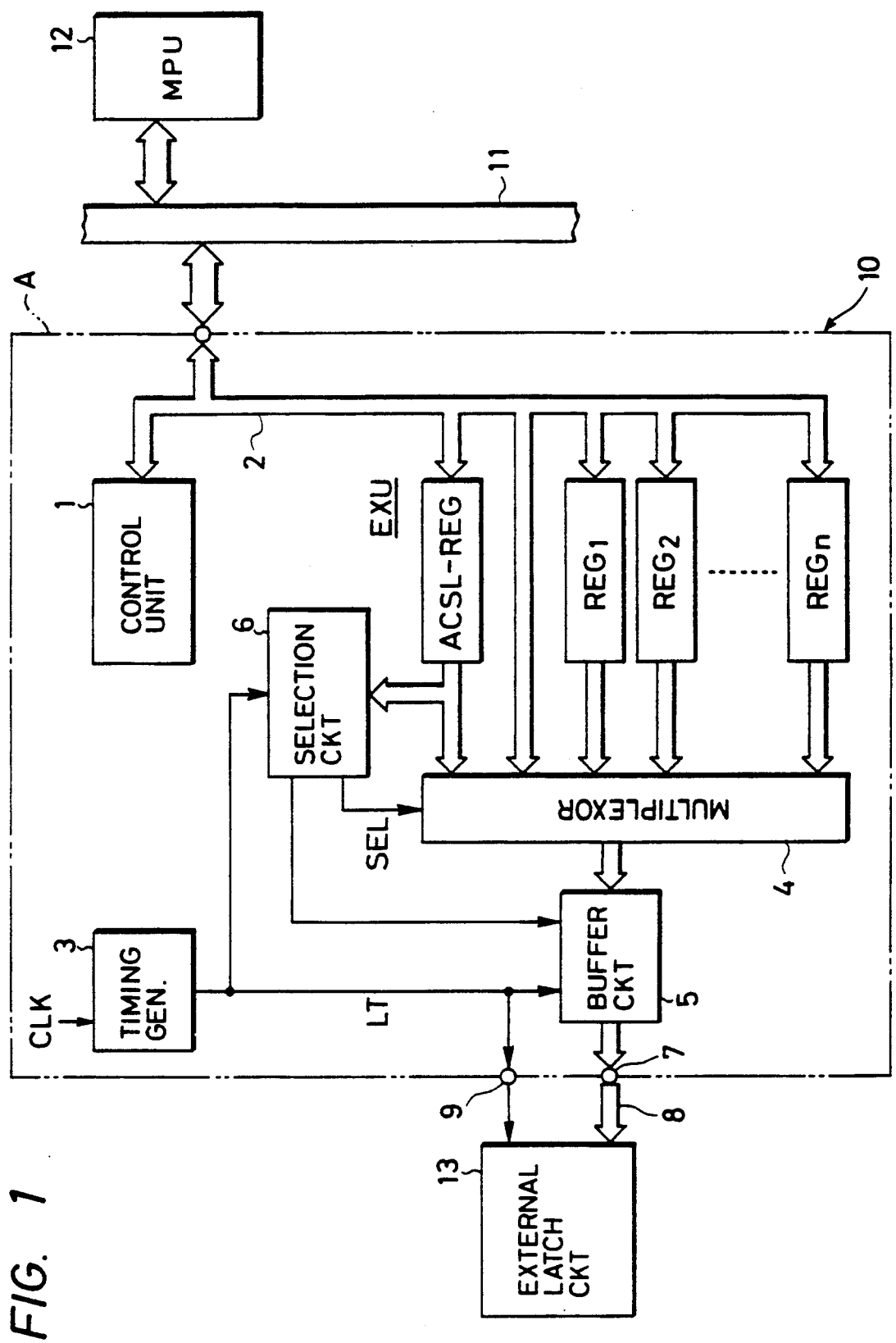
FIG. 1 is a block diagram of a controller LSI in accordance with one embodiment of the present invention.

FIG. 1 is a block diagram showing an example of a controller LSI to which the present invention is applied. In the drawing, each circuit block encompassed by one-dot-chain line A is formed on one semi-conductor substrate (chip) such as a single crystalline silicon substrate, though it is not particularly limitative.

In the drawing, reference numeral 1 represents a control unit which decodes a command supplied from a microprocessor 12 outside the chip through a system bus 11 and controls an execution unit EXU constituting an arithmetic and logic unit (not shown) and registers $REG_1$, $REG_2$, ..., $REG_n$ in accordance with the sequence indicated by the command. The detailed construction of the control unit 1 itself is not directly relevant to the present invention and, hence, is not shown in the drawing. However, it comprises, for example, a micro ROM storing therein a microprogram for decoding and executing a predetermined command and a microprogram sequencer which receives the next address outputted form the micro ROM and the data from a suitable register, such as a flag register, and forms the next address to be supplied to the micro ROM.

The control unit 1 and the working registers $REG_1$-$REG_n$ are connected to one another through an internal data bus 2. Direct access to these working registers $REG_1$-$REG_n$ can be made form the external microprocessor 12, and data can be written into and read out from them by the microprocessor 12 through the internal data bus 2. Reference numeral 3 represents a timing generation circuit which forms internal timing signals on the basis of a system clock CLK.

The construction described above is the same as that of the conventional controller LSI. In this embodiment, however, the contents of the working registers REG$_1$-REG$_n$ can be loaded selectively into the buffer circuit 5 through a multiplexor 4. In addition, a designating register ACSL-REG which designated the working register, whose content must be known, among these working registers REG$_1$-REG$_n$ is also newly provided and this register ACSL-REG is connected to the internal bus 2.

Though not particularly limitative, the content of this designating register ACSL-REG, too, can be loaded into the buffer circuit 5 through the multiplexor 4. However, it is necessary that the microprocessor write in advance the content of the designating register ACSL-REG through the internal data bus 2.

In this embodiment, there is also provided a selection circuit 6 which takes thereinto the content of the designating register ACSL-REG on the basis of a suitable timing signal LT supplied from the timing generation circuit 3, and forms a selection signal SEL for driving the multiplexer 4 on the basis of the data thus taken into the selection circuit 6. This selection circuit 6 makes it possible to selectively load the content of the register (REG$_1$-REG$_n$, ACSL-REG) designated by the designating register ACSL-REG into the buffer circuit 5.

The buffer circuit 5 takes thereinto and holds the data supplied form the designated register which is selected by the multiplexor 4, and outputs the data to an output pin 7 in synchronism with the timing signal LT described above. Though not particularly limitative, the output pin 7 is connected to an external data bus 8 and is normally used as a data output pin.

The timing signal LT representing the output timing of the buffer circuit 5 is outputted to the output as a signal representing the load timing, through a suitable output pin 9. When the output pin 7 connected to the buffer circuit 5 is connected to the external data bus 8 as described above, the timing signal LT represents the period in which the controller does not use this external data bus 8. Since the controller itself always knows the internal status, such a signal can be generated easily by the timing generation circuit 3. Incidentally, in a controller LSI, such as a CRT controller, a horizontal synchronizing signal formed by the controller changes in response to the use/non-use status of the bus, and hence can be used as the timing signal LT described above.

Though not particularly limitative, the internal data bus 2 itself is also connected to the multiplexor 4 in this embodiment in order to utilize the empty time of the external data bus 8 and to output the signal on the internal data bus 2 to the output pin 7 through the multiplexor 4.

Figure 2:
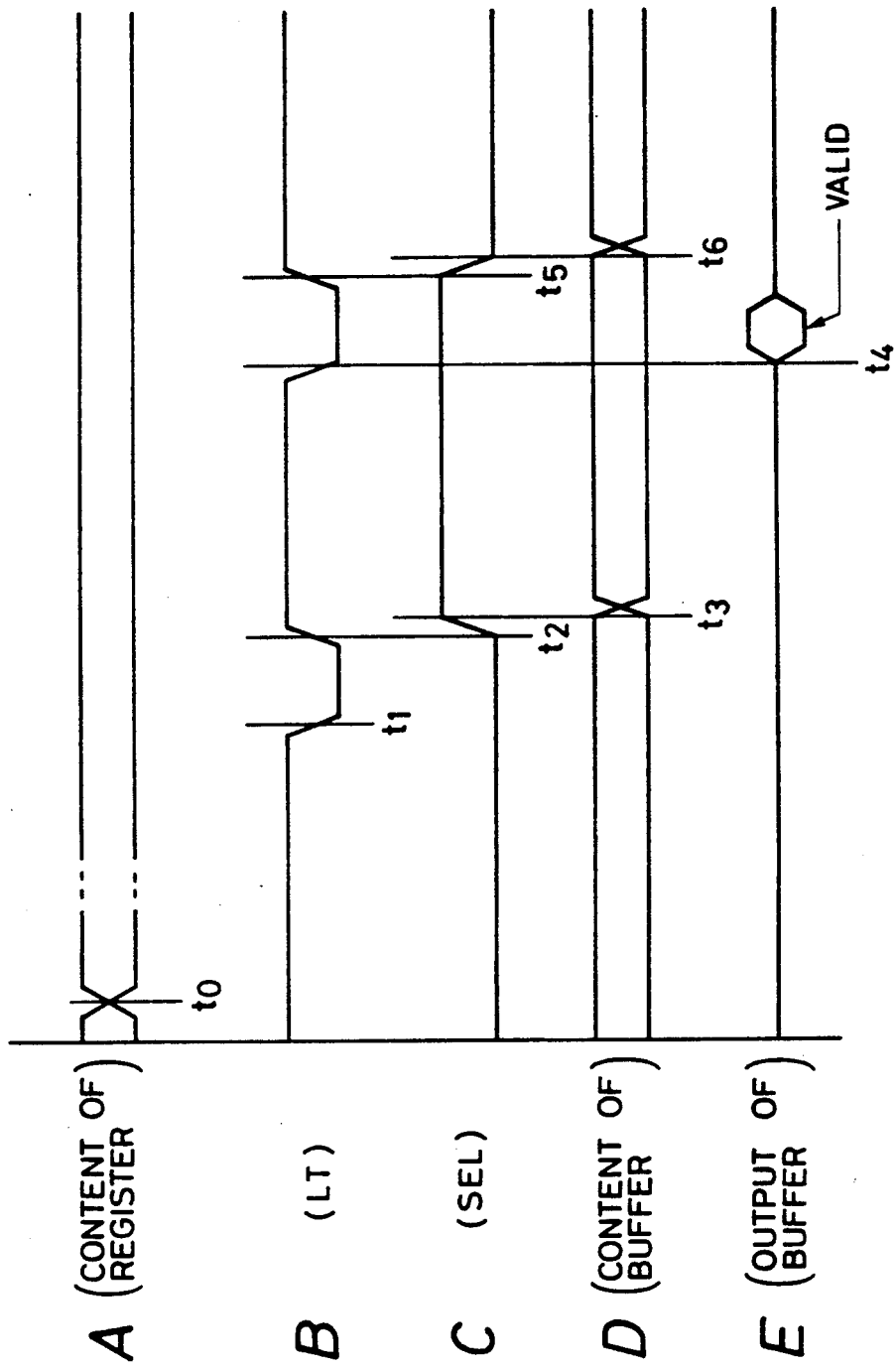
FIG. 2 is a timing chart of the controller LSI shown in FIG. 1.

FIG. 2 shows the timing at which the content of a register is outputted by the circuit of the embodiment described above.

During the period in which the timing signal LT, such as the horizontal synchronizing signal which changes in response to the status of the external bus, is at the low level, such as in a period t1-t2 in FIG. 2B, the external bus 8 is supposed not to be used. In accordance with the embodiment described above, the content (the code number of the register) of the designating register ACSL-REG is taken into the selection circuit 6 in synchronism with the rise of the timing signal LT.

The selection circuit 6 generates the selection signal SEL to be supplied to the multiplexor 4 by decoding the content of the register ACSL-REG. Upon receiving this signal, the multiplexor 4 sends only the content of the designated register to the buffer circuit 5. The buffer circuit 5 holds the data sent from the multiplexor 4 in synchronism with the rise of the timing signal LT, such as at the time t2, though this is not particularly limitative, and outputs the data for a predetermined period of time at the timing at which the timing signal LT changes from the high level to the low level again such as at the time t4.

On the other hand, the timing signal LT described above is also outputted to the outside from the pin 9 as the signal representing the load timing. Therefore, the latch circuit 13 that is disposed outside takes thereinto the data on the external data bus 8 in synchronism with the fall of this timing signal LT, whereby the content of the designated register can be loaded into the external latch circuit 13. Therefore, the external control circuit including the microprocessor can immediately detect the content of a desired register by examining the content of the latch circuit 13 through the external data bus 8, whenever necessary.

In accordance with the embodiment described above, the content of the internal register can be read out by only a simple external circuit (the latch circuit 13). Moreover, since the register content can be read out without direct access to the internal register by the microprocessor, the operation speed can be improved, the load to the software can be reduced and the through-put of the system can be improved because the data is taken out by utilizing the empty time of the bus.

If the signal which is outputted to the outside in response to the status of the external bus, such as the horizontal sync signal in the CRT controller, is used as the load timing signal LT, it is not at all necessary to provide an output pin 9 for the timing signal because such a signal is to be originally outputted from the controller. Hence, it is not at all necessary to increase the number of pins.

In the embodiment described above, the code number of one register is set into the designating register ACSL-REG so as to output the content of one designated register to the external data bus 8. However, it is possible to sequentially output to the outside the contents of a plurality of registers by setting the code numbers of a plurality of registers into the designating register ACSL-REG and decoding them sequentially by the selection circuit 6.

Figure 3:
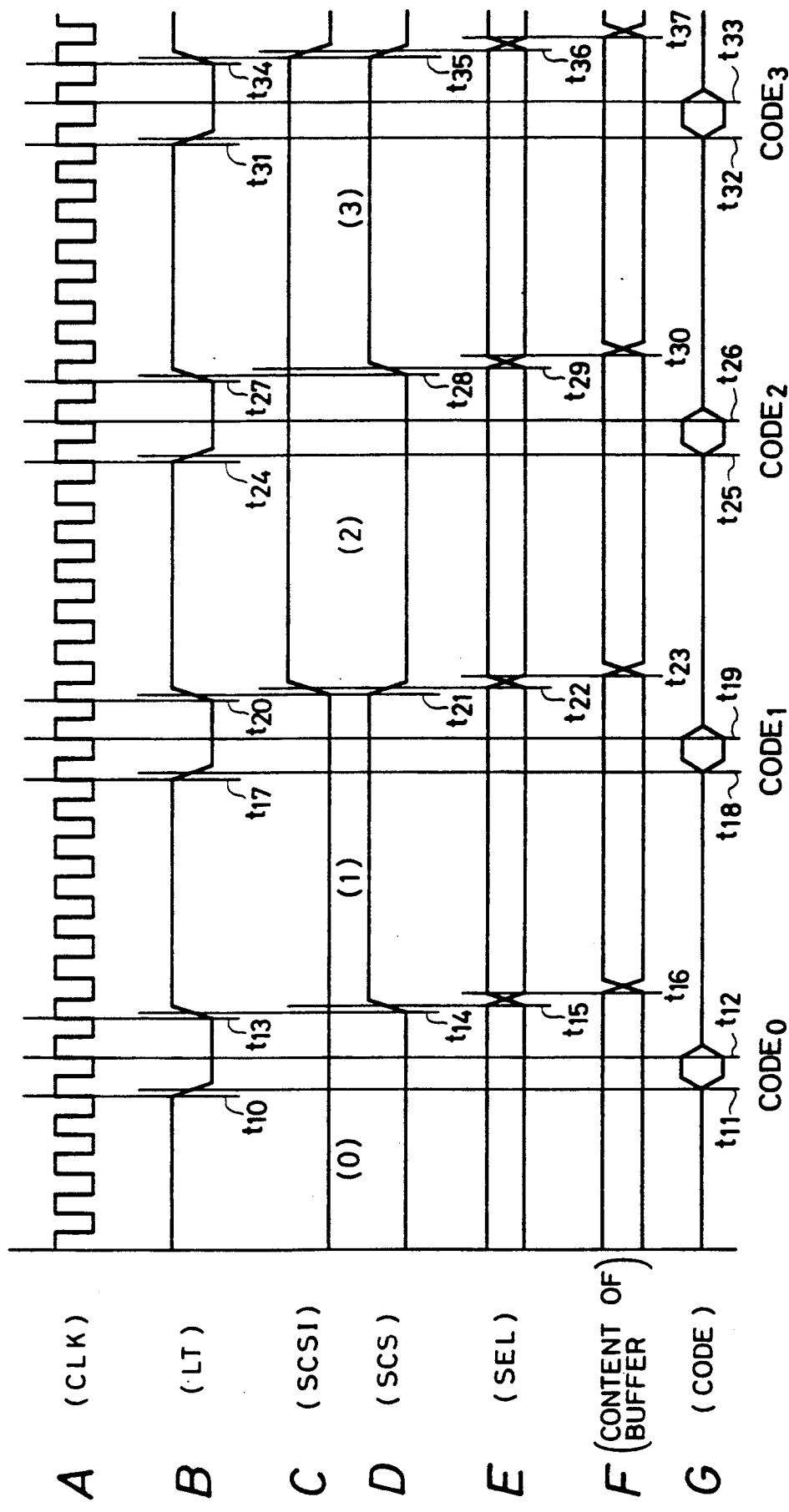
FIG. 3 is a timing chart of the case where a plurality of register codes can be set to a designating register.

FIG. 3 shows the timing of the case where the contents of four arbitrarily selected registers are read out, by way of example.

Though not particularly limitative, the selection circuit 6 includes a sequence control circuit (not shown) comprising a counter circuit which forms 2-bit sequence control signals SCS1 and SCS2 (see FIGS. 3C and 3D) to be supplied to the designating register ACSL-REG on the basis of a timing signal. Thus, the selection circuit 6 sequentially loads the four codes CODE$_0$-CODE$_3$ inside the designating register ACSL-REG thereto in synchronism with the fall of the timing signal LT.

The selection circuit 6 sequentially outputs the selection signals SEL in synchronism with the rise of the timing signal LT on the basis of the codes CODE$_0$-CODE$_3$ as shown in FIG. 3E. When the selection signal SEL changes, the multiplexor 4 is changed over in response thereto and the content of the buffer circuit 5 changes. Furthermore, the sequence control signal SCS supplied to the designating register ACSL-REG changes in synchronism with the change of the selection signal SEL, and loading of the next code is effected.

In the case described above, if the read sequence of the codes in the designating register ACSL-REG is made sequentially from the beginning as described above, the contents of the registers are outputted from the buffer circuit 5 in the predetermined sequence so that the microprocessor can detect in advance the content of which register is outputted. Incidentally, if difficult to detect from the outside the content of the register of which the code number is read out, the sequence control signal SCS may be outputted to the outside, too.

Instead of supplying the sequence control signals SCS1, SCS2 to the designating register ACSL-REG and sequentially loading the internal codes into the selection circuit 6, it is also possible to first load the content of the designating register ACSL-REG having therein the sequence control signal SCS into the selection circuit 6 and to form the selection signal SEL by sequentially decoding the four codes.

In the embodiment described above, the content of the register inside the controller LSI can be read out. Alternatively, it is possible to employ a circuit construction in which a register for designating an internal signal, a selection circuit and a buffer circuit for holding the signal of the selection circuit are disposed similarly, and a desired internal signal is outputted to the outside from a data output pin at the empty time of an external data bus.

In the controller LSI, such as the CRT controller, the number of bits of the external data bus is sometimes greater than that of the internal register. In such a case, a desired internal signal or signals can be outputted by use of excessive data output pins simultaneously with the read-out of the register content.

Furthermore, the sequence control signal SCS, too, can be outputted to the outside by use of the excessive data output pin. In such a case, there is no need at all to additionally provide the pins.

Figure 5:
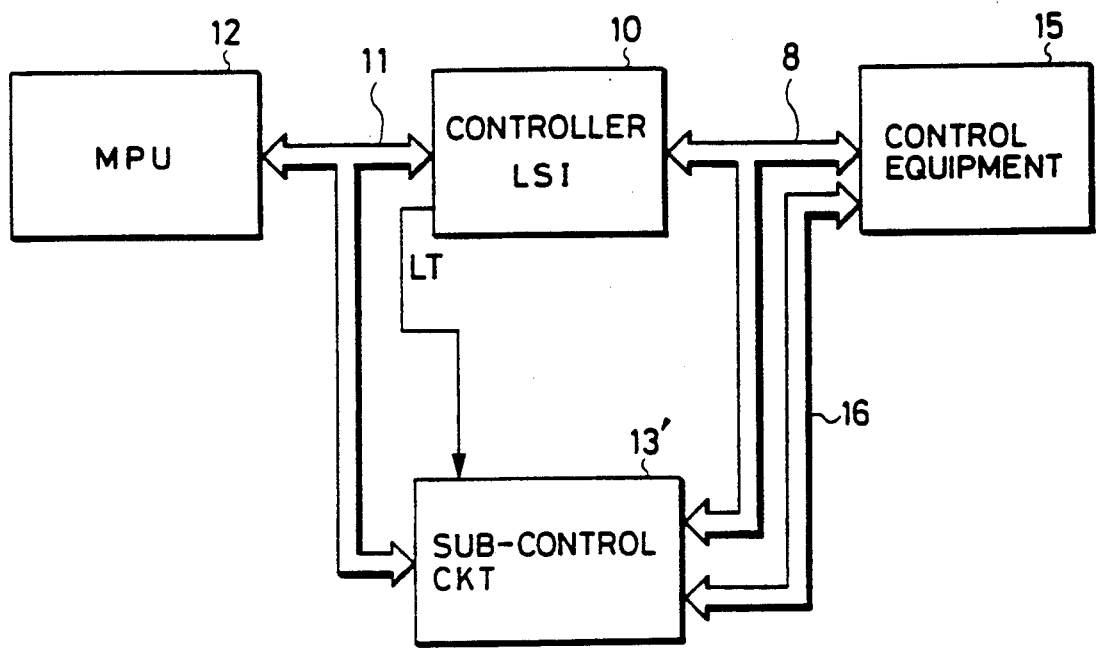
FIG. 5 is a block diagram showing an example of a system using the controller LSI in accordance with the present invention.

FIG. 5 shows an example of the construction of microcomputer systems using the controller LSI 10 such as the CRT controller in accordance with the present invention. Control equipment 15 such as a CRT display is disposed under control of the controller LSI 10 connected to the microprocessor 12 through a system bus 11. A sub-control circuit 13' comprising principally latch circuits is connected to the external bus 8 as an external circuit of the controller LSI 10.

The sub-control circuit 13' is formed by adding a circuit which generates a control signal for the control equipment 15 on the basis of the latched content to the latch circuit 13 described above.

Figure 4:
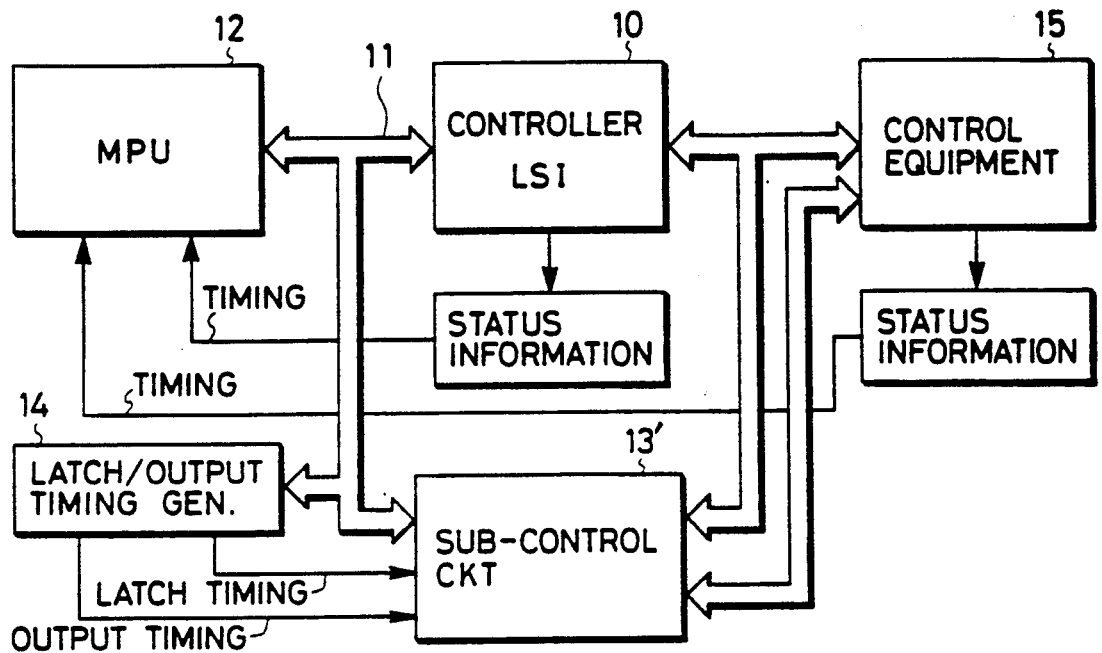
FIG. 4 is a block diagram showing an example of a system using a conventional controller LSI.

When, in the system using the conventional controller LSI, it is desired to use the content of the internal register or the internal signal at the outside, it has been necessary to use a timing generation circuit 14 which supervises the input/output status of the LSI and generates the latch timing in the external circuit 13' or data output timing of the microprocessor and other devices, in addition to the sub-control circuit 13' which latches the desired data and signals, as shown in FIG. 4.

In contrast, in the system using the controller LSI in accordance with the present invention, only the sub-control circuit 13' comprising principally the latch circuits is externally added to the controller LSI 10 as shown in FIG. 5, and this circuit arrangement makes it possible to read out the content of the internal register. Therefore, the external circuit can be simplified as compared to the prior art system. Moreover, since the register content can be read out without direct access to the register by the microprocessor, the operation speed can be improved, the load to the software can be reduced, and the through-put of the system can be improved because the empty time of the bus is utilized to take out the register content or the internal signal.

Incidentally, it is possible to connect the subcontrol circuit 13' (the latch circuit 13) to the control equipment 15 by a bus 16 so that the signal of the control equipment 15 can be latched directly by the latch circuit.

The present invention provides the following effects.

(1) The register for designating the register whose content must be referred to and the buffer for taking thereinto the content of the register to be referred to or the internal signal are newly provided in the controller LSI, the content of the designated register is taken into the buffer circuit and is outputted to the outside by use of a suitable internal signal corresponding to the period which does not affect the control of the external system, that is, the period in which the controller LSI does not use the bus, and the suitable internal signal is outputted outside the LSI as a signal representing the load timing. Therefore, the microprocessor can detect the content of the register without making access to the register in the controller LSI. Due to this operation, the bus efficiency can be improved, the through-put of the system can be improved and the load to the software can be reduced. Moreover, the present invention makes it possible to detect the internal status that has not been accomplished by the prior art technique.

(2) The register for designating the register whose content must be referred to and the buffer for taking thereinto the content of the register to be referred to or the internal signal are newly provided in the controller LSI, the content of the designated register is taken into the buffer circuit and is outputted to the outside by use of a suitable internal signal corresponding to the period which does not affect the control of the external system, that is, the period in which the controller LSI does not use the bus, and the suitable internal signal is outputted outside the LSI as a signal representing the load timing. Therefore, it is only necessary outside the LSI to latch the data of the predetermined output pin on the basis of the load timing signal, so that the external circuit necessary for reading out the register content can be simplified.

While the present invention has thus been described in its preferred embodiments, it is to be understood that various changes and modifications may be made naturally by those skilled in the art without departing from the spirit or scope of the appended claims. For instance, two or more designating registers ACSL-REGs may be provided.

It is also possible to make the desired selection by use of the addresses allotted to the registers instead of setting in advance the code numbers for designating the register to be referred to.

The present invention is not particularly limited to the controller LSIs of the microcomputer peripheral units such as the CRT controller, the DMA controller, the disk controller, and so forth, but can be used for the controlled LSIs in the general including microprocessor or microcomputers.

What is claimed is:

1. A display controller integrated circuit device for controlling an operation of a control unit which controls a display, said control unit being coupled to said display controller integrated circuit device via an external bus; and external control means, coupled to said display controller integrated circuit via said external bus and to said control unit, for controlling an operation of said control unit other than said operation controlled by said display controller integrated circuit device; said display controller integrated circuit device comprising:
   control data holding means for holding a control data;
   synchronizing signal generating means for generating a horizontal synchronizing signal;
   first external terminals coupled to said external bus;
   output means, coupled between said first external terminals and said control data holding means, for providing said control data to said external bus during a period of time in which said horizontal synchronizing signal has a predetermined state;
   a second external terminal, coupled to said external control means, for providing a timing signal to said external control means; and
   timing signal generating means, coupled to said second external terminal and responsive to a state change in said horizontal synchronizing signal, for generating said timing signal;
   wherein said external control means fetches said control data in response to said timing signal to control said other operation of said control unit.

2. A display controller integrated circuit device according to claim 1, further comprising:
   second control data holding means for holding control data; and
   selecting means, coupled to said control data holding means and to said second control data holding means, for providing control data held in one of said control data holding means and said second control data holding means to said output means.

3. A display controller integrated circuit device according to claim 2, wherein said selecting means includes indication data holding means for holding indication data for indicating one of said control data holding means and said second control data holding means, and means for selecting one of said control data holding means and said second control data holding means in accordance with said indication data.

4. A display controller integrated circuit device according to claim 3, further comprising:
   third external terminals for receiving said control data and said indication data; and
   an internal bus coupled to said third external terminals, said control data holding means, said second control data holding means and said selecting means thereby permitting control data and indication data to be stored into said control data holding means and said second control data holding means and said indication data holding means, respectively.

5. A display controller integrated circuit device according the claim 1, further comprising:
   third external terminals for receiving control data; and
   an internal bus coupled to said third external terminals and said control data holding means thereby permitting control data to be stored into said control data holding means.

6. A display controller integrated circuit device according to claim 5, wherein a microprocessor, coupled to said third external terminals, provides said control data to said display controller integrated circuit device.

7. In a system including a display controller integrated circuit device for controlling an operation of a control unit which controls a CRT display, said control unit being coupled to said display controller integrated circuit device via a first external bus, external control means coupled to said control unit via said first external bus for controlling an operation of said control unit other than said operation controlled by said controller integrated circuit device, and a microprocessor coupled to said display controller integrated circuit device via a second external bus being different from said first external bus, said display controller integrated circuit device comprising:
   control data holding means for holding control data;
   synchronizing signal generating means for generating a horizontal synchronizing signal;
   first external terminals coupled to said first external bus;
   output means, coupled between said first external terminals and said control data holding means, for providing said control data to said first external bus during a period of time in which said horizontal synchronizing signal has a predetermined state;
   a second external terminal, coupled to said external control means, for providing a timing signal to said external control means; and
   timing signal generating means, coupled to said second external terminal and responsive to a state change in said horizontal synchronizing signal, for generating said timing signal;
   wherein said external control means fetches said control data in response to said timing signal to control said other operation of said control unit.

8. A system according to claim 7, further comprising:
   second control data holding means for holding control data; and
   selecting means, coupled to said control data holding means and said second control data holding means, for providing control data held in one of said control data holding means and said second control data holding means to said output means.

9. A system according to claim 8, wherein said selecting means includes indication data holding means for holding indication data for indicating one of said control data holding means and said second control data holding means, and means for selecting one of said control data holding means and said second control data holding means in accordance with said indication data.

10. A system according to claim 9, further comprising:
   third external terminals for receiving said control data and said indication data via said second external bus; and
   an internal bus coupled to said third external terminals, said control data holding means, said second control data holding means and said selecting means, thereby permitting control data and indication data to be stored into said control data holding means and second control data holding means and said indication data holding means, respectively.

11. A system according to claim 7, further comprising:
   third external terminals for receiving control data via said second external bus; and an internal bus coupled to said third external terminals and said control data holding means thereby permitting control data to be stored into said control data holding means.

12. A system according to claim 11, wherein said microprocessor provides said control data to said display controller integrated circuit device via said second external bus.

* * * * *